(12) United States Patent
Kobayashi

(10) Patent No.: US 11,394,893 B2
(45) Date of Patent: Jul. 19, 2022

(54) IMAGE GENERATION APPARATUS, IMAGE GENERATION METHOD, AND STORAGE MEDIA

(71) Applicant: Morpho, Inc., Tokyo (JP)

(72) Inventor: Michihiro Kobayashi, Tokyo (JP)

(73) Assignee: Morpho, Inc., Tokyo (JP)

( * ) Notice: Subject to any disclaimer, the term of this patent is extended or adjusted under 35 U.S.C. 154(b) by 261 days.

(21) Appl. No.: 16/687,911

(22) Filed: Nov. 19, 2019

(65) Prior Publication Data

US 2020/0162657 A1 May 21, 2020

(30) Foreign Application Priority Data

Nov. 21, 2018 (JP) .............................. JP2018-218529

(51) Int. Cl.
*H04N 5/235* (2006.01)
*H04N 11/20* (2006.01)

(52) U.S. Cl.
CPC ......... *H04N 5/2355* (2013.01); *H04N 5/2351* (2013.01); *H04N 5/2353* (2013.01); *H04N 11/20* (2013.01)

(58) Field of Classification Search
CPC .... H04N 5/2355; H04N 11/20; H04N 5/2351; H04N 5/2353; H04N 1/387; H04N 1/2112; H04N 2201/3247; H04N 1/215; H04N 5/2356; H04N 5/235; G06T 2207/20221; G06T 2207/20208; G06T 5/009; G06T 5/50
See application file for complete search history.

(56) References Cited

U.S. PATENT DOCUMENTS

| | | | |
|---|---|---|---|
| 2005/0275747 A1* | 12/2005 | Nayar ................. | H04N 5/2351 348/362 |
| 2008/0284872 A1* | 11/2008 | Asoma ................ | H04N 5/2355 348/229.1 |
| 2010/0157078 A1* | 6/2010 | Atanassov ............ | G06T 5/007 348/222.1 |
| 2012/0105681 A1* | 5/2012 | Morales ................ | H04N 5/235 348/239 |
| 2013/0332866 A1 | 12/2013 | Johnson et al. | |

(Continued)

FOREIGN PATENT DOCUMENTS

| CN | 102420944 A | 4/2012 |
|---|---|---|
| CN | 102724400 A | 10/2012 |

(Continued)

*Primary Examiner* — Lin Ye
*Assistant Examiner* — Tuan H Le
(74) *Attorney, Agent, or Firm* — Sughrue Mion, PLLC

(57) ABSTRACT

The image generation apparatus includes: an acquisition unit configured to acquire a base image, a reference image, the respective exposure values associated with the base image and the reference image, and a pseudo-exposure value different from the respective exposure values associated with the base image and the reference image; an estimation unit configured to estimate a conversion parameter; and a generation unit configured to generate a pseudo-image regarded as an image photographed with the pseudo-exposure value by converting the luminance value of the base image for each of the pixels based on the respective exposure values associated with the base image and the reference image, the pseudo-exposure value, and the conversion parameter.

12 Claims, 6 Drawing Sheets

(56) References Cited

U.S. PATENT DOCUMENTS

| | | | |
|---|---|---|---|
| 2015/0015774 A1* | 1/2015 | Sugie | H04N 5/2353 348/364 |
| 2015/0116525 A1* | 4/2015 | Peng | H04N 5/23254 348/218.1 |
| 2017/0171449 A1 | 6/2017 | Kino | |
| 2019/0138259 A1* | 5/2019 | Bagaria | H04N 5/23248 |

FOREIGN PATENT DOCUMENTS

| | | |
|---|---|---|
| CN | 106506983 A | 3/2017 |
| JP | 2001-197361 A | 7/2001 |
| JP | 2009-005395 A | 1/2009 |
| JP | 2014-27466 A | 2/2014 |

\* cited by examiner

IMAGE GENERATION APPARATUS, IMAGE GENERATION METHOD, AND STORAGE MEDIA

CROSS-REFERENCE TO RELATED APPLICATIONS

This application is based on and claims the benefit of priority from Japanese Patent Application No. 2018-218529 filed on Nov. 21, 2018, and the entire contents of which are incorporated herein by reference.

TECHNICAL FIELD

The present disclosure relates to an image generation apparatus, an image generation method, and a storage media.

BACKGROUND

Japanese Patent Application Laid-Open Publication No. 2014-027466 discloses an imaging apparatus that can obtain a plurality of images regarded as being photographed at the same time. The imaging apparatus includes consecutive imaging means consecutively imaging and storing a plurality of images, image composing means composing a first image by adding all of the plurality of images, and second image generation means generating a second image different in exposure from the first image. The second image is obtained by multiplying each of pixel values of the first image by a coefficient. Alternatively, the second image is obtained from arithmetic mean of the plurality of images.

SUMMARY

The imaging apparatus disclosed in Japanese Patent Application Laid-Open Publication No. 2014-027466, however, only generates the first image and the second image that are photographed at the same time period, and cannot generate an image that is photographed at the timing same as the timing of one image photographed by the consecutive imaging means. Further, in the imaging apparatus disclosed in Patent Literature 1, the images photographed at the same time period are added. Therefore, an original appearance of a moving object cannot be depicted in each of the first image and the second image, and a so-called ghost occurs.

An object of the present disclosure is to provide an image generation apparatus obtaining an image that is regarded as being photographed at the same timing with a different exposure value relative to one photographed image.

An image generation apparatus according to the present disclosure includes an acquisition unit configured to acquire a base image and a reference image photographed with different exposure values, the respective exposure values associated with the base image and the reference image, and a pseudo-exposure value different from the respective exposure values associated with the base image and the reference image; an estimation unit configured to estimate a conversion parameter, wherein the conversion parameter corresponds a difference between the respective exposure values associated with the base image and the reference image, and correlates a luminance value of the base image with a luminance value of the reference image for each of pixels; and a generation unit configured to generate a pseudo-image regarded as an image photographed with the pseudo-exposure value by converting the luminance value of the base image for each of the pixels based on the respective exposure values associated with the base image and the reference image, the pseudo-exposure value, and the conversion parameter.

According to the image generation apparatus, the acquisition unit acquires the base image and the reference image photographed with the different exposure values, the respective exposure values associated with the base image and the reference image, and the pseudo-exposure value different from the respective exposure values associated with the base image and the reference image. The estimation unit estimates the conversion parameter that corresponds to the difference between the respective exposure values associated with the base image and the reference image, and correlates the luminance value of the base image with the luminance value of the reference image for each of the pixels. The generation unit generates the pseudo-image regarded as the image photographed with the pseudo-exposure value by converting the luminance value of the base image for each of the pixels based on the respective exposure values associated with the base image and the reference image, the pseudo-exposure value, and the conversion parameter. Since the pseudo-image is obtained by converting the luminance value of the base image for each of the pixels, the apparatus can obtain an image that is regarded as being photographed at the same timing as the timing of the base image, with the exposure value different from the respective exposure values of the base image and the reference image. Further, the pseudo-image is generated not based on addition of pixel values of the plurality of images but based on the base image. Therefore, ghost derived from addition does not occur. Accordingly, the image generation apparatus can obtain an image that is regarded as being photographed at the same timing with a different exposure value relative to one photographed image.

The various aspects and embodiments according to the present disclosure make it possible to obtain the image that is regarded as being photographed at the same timing with the different exposure value relative to one photographed image.

DETAILED DESCRIPTION

Figure 1:
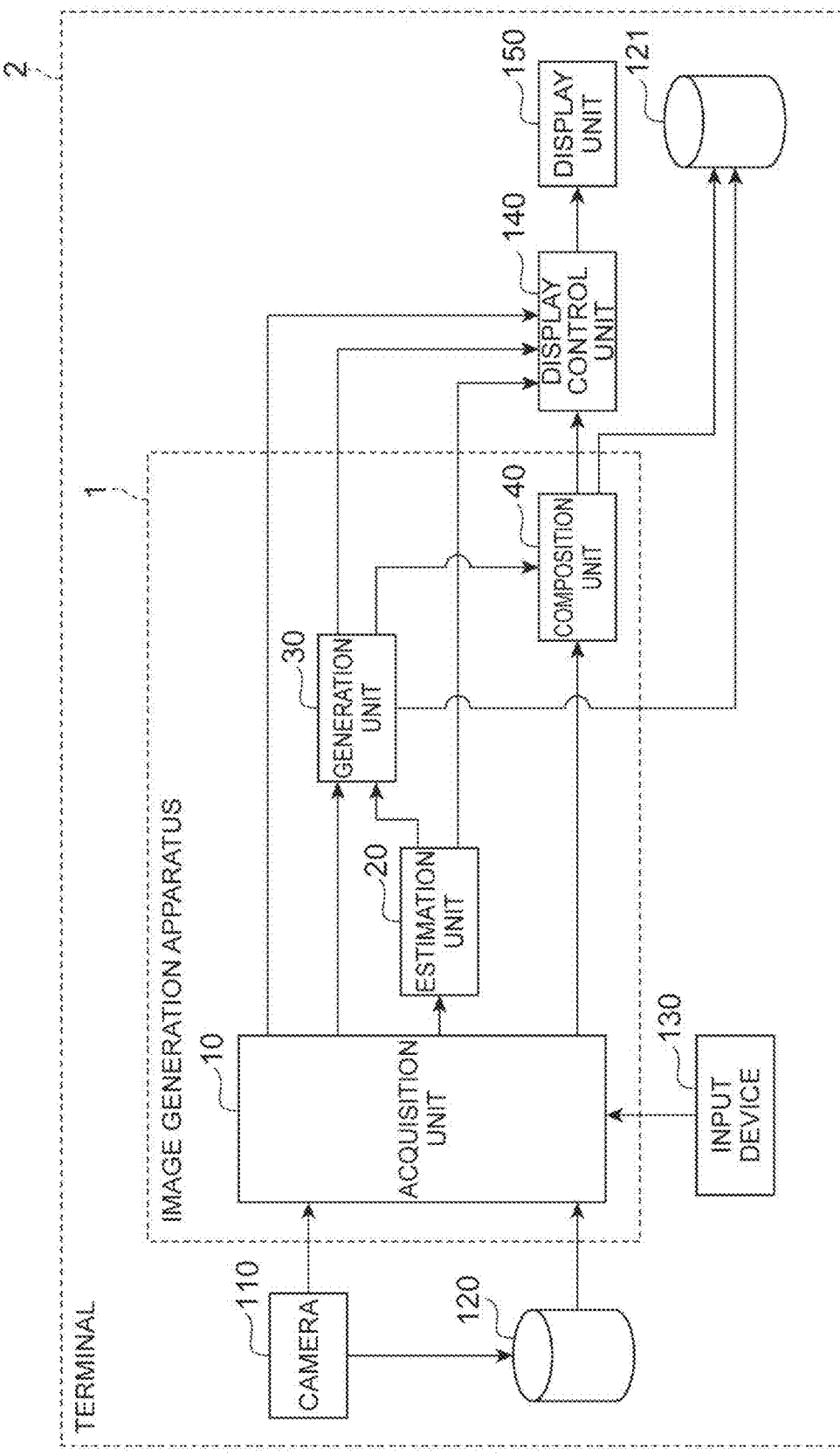
FIG. 1 is a block diagram illustrating an example of functions of a terminal including an image generation apparatus according to an embodiment.

Hereinafter, various embodiments are described in detail with reference to drawings. Note that, in the following description and drawings, the same or equivalent components are denoted by the same reference numerals, and repetitive description is omitted.

[Configuration of Image Generation Apparatus 1]

FIG. 1 is a block diagram illustrating an example of functions of a terminal including an image generation apparatus according to an embodiment. The image generation apparatus 1 illustrated in FIG. 1 includes an acquisition unit 10, an estimation unit 20, and a generation unit 30, and generates an image regarded as being photographed with a designated exposure value, from a plurality of images photographed with different exposure values. The image generation apparatus 1 is mounted on, for example, a terminal 2. Examples of the terminal 2 include a mobile terminal limited in resources such as a mobile phone, a digital camera, and a PDA (Personal Digital Assistant), and a computer system.

Figure 2:
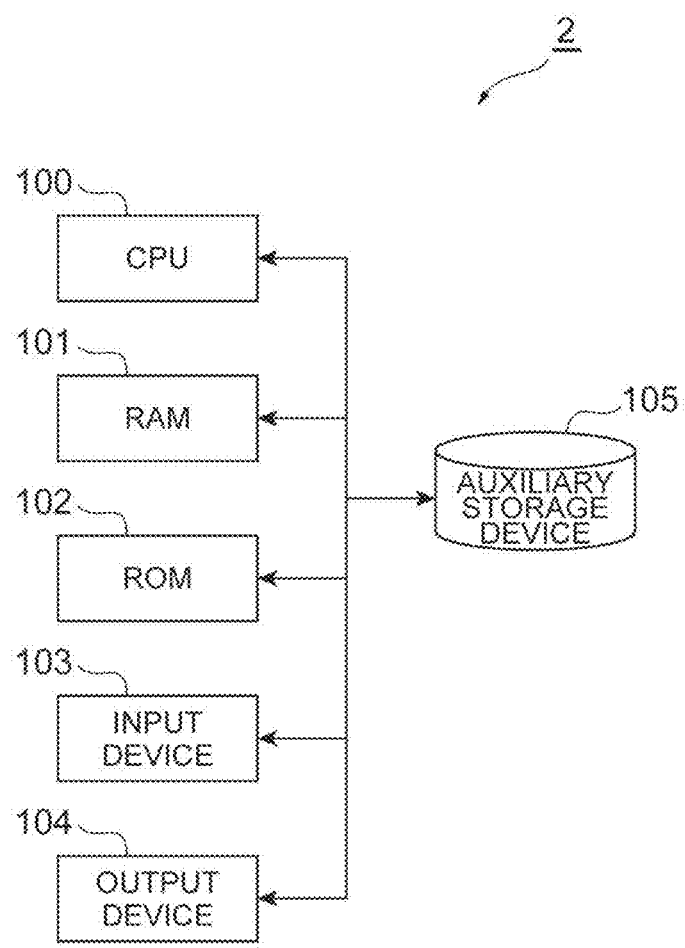
FIG. 2 is a block diagram illustrating a hardware configuration of the terminal including the image generation apparatus according to the embodiment.

FIG. 2 is a block diagram illustrating a hardware configuration of the terminal including the image generation apparatus according to the embodiment. As illustrated in FIG. 2, the terminal 2 is configured as a normal computer system that includes a CPU (Central Processing Unit) 100, a main storage device such as a ROM (Read Only Memory) 101 and a RAM (Random Access Memory) 102, an input device 103 such as a camera and a keyboard, an output device 104 such as a display, and an auxiliary storage device 105 such as a hard disk.

Functions of the image generation apparatus 1 are achieved when predetermined computer software is read by the hardware such as the CPU 100, the ROM 101, and the RAM 102 to operate the input device 103 and the output device 104 under the control of the CPU 100 as well as to perform reading and writing of data in the main storage device and the auxiliary storage device 105. The terminal 2 may include a communication module or the like.

Referring back to FIG. 1, the terminal 2 includes the image generation apparatus 1, a camera 110, recording devices 120 and 121, an input device 130, a display control unit 140, and a display unit 150. The camera 110 is an apparatus capturing an image. As the camera 110, for example, a CMOS (Complementary Metal-Oxide Semiconductor) pixel sensor is used. For example, the camera 110 includes a consecutive imaging function to repeatedly perform imaging at a predetermined interval from timing designated by user operation. In other words, the camera 110 includes a function to acquire not only one still image but also a plurality of still images (consecutive frame images). The camera 110 includes a function (bracket imaging function) to acquire consecutive frame images by changing an exposure value for each image. In other words, the images consecutively photographed by the camera 110 are images different in exposure value.

The exposure value is a stepped numerical index representing an exposure amount that is adjusted based on an aperture value, a shutter speed, and ISO sensitivity set in the camera 110. The exposure amount is a quantified amount of light applied to a photosensitive material inside the camera 110, and is determined from light intensity and an exposure time. A unit of the exposure value is step. For example, in a case where a change amount of the exposure amount is a power of two, the change amount of the exposure value can be presented by the power.

The exposure value associated with an image is an exposure value uniquely corresponding to the image, and is an exposure value stored, by the camera 110, in prescribed metadata that is included in a data file of the photographed image and is based on Exif (Exchangeable image file format) standard. The prescribed metadata based on the Exif standard is one specific file format commonly used for a digital camera, and includes, for example, an aperture value, a shutter speed, and ISO sensitivity. Note that the exposure value may be directly input to the data file of the photographed image by user operation.

The camera 110 includes, for example, a function to output the image including the above-described metadata, to the acquisition unit 10 and the recording device 120 every time imaging is performed. The recording device 120 is a recording medium such as a hard disk. The recording device 120 records the image including the above-described metadata. The recording device 120 may record an image photographed in the past.

The input device 130 receives input of the exposure value by the user operation. The input device 130 is, for example, a touch panel. The input device 130 is connected to the acquisition unit 10, and transmits the exposure value set by the user operation, to the acquisition unit 10.

The image generation apparatus 1 includes the acquisition unit 10, the estimation unit 20, and the generation unit 30. The acquisition unit 10 acquires a base image 3 and a reference image 4 that are photographed with different exposure values, an exposure value X and an exposure value Y that are respectively associated with the base image 3 and the reference image 4, and a pseudo-exposure value Z that is different from the exposure value X and the exposure value Y. In the acquisition unit 10, a process to acquire the base image 3, the reference image 4, the exposure value X, and the exposure Y is different from a process to acquire the pseudo-exposure value Z. Therefore, the processes are sequentially described.

The process to acquire the base image 3, the reference image 4, the exposure value X, and the exposure value Y by the acquisition unit 10 is described. The acquisition unit 10 acquires the base image 3, the reference image 4, the exposure value X, and the exposure value Y from the camera 110. Alternatively, the acquisition unit 10 may acquire the base image 3, the reference image 4, the exposure value X, and the exposure value Y by referring to the recording device 120.

The acquisition unit 10 can select optional images as the base image 3 and the reference image 4 from acquired images. The acquisition unit 10 may acquire a plurality of images and the pseudo-exposure value Z, may acquire, as the base image 3, an image photographed with an exposure value having the smallest difference from the pseudo-exposure value Z among the plurality of images, and may acquire, as the reference image 4, an image other than the base image 3 among the plurality of images.

For example, the base image 3 may be an image having the largest number of effective pixels among the plurality of images acquired by the acquisition unit 10. The effective pixel is a pixel in which underexposure or overexposure does not occur. The underexposure indicates a state where a pixel with an excessively-small exposure amount in imaging loses gradation information and becomes a solid black pixel, in an image obtained by imaging an object with considerable difference in brightness. The overexposure indicates a state where a pixel with an excess exposure amount loses the gradation information and becomes a solid white pixel, in the image obtained by imaging the object with considerable difference in brightness. The gradation indicates a degree of change in grey level in the image. The underexposure or the overexposure is determined based on a luminance value of the pixel. When the image having the largest number of effective pixels is acquired as the base image 3, the gradation information is not lost and the acquisition unit 10 can acquire an accurate luminance value for each pixel. This makes it possible to secure a large number of pixels effective in the processing by the estimation unit 20 or the generation unit 30.

For example, the reference image 4 is selected from remaining images excluding the base image 3 among the plurality of images acquired by the acquisition unit 10. The acquisition unit 10 acquires at least two images serving as the base image 3 and the reference image 4. The plurality of images may be acquired as the reference images 4. For example, the reference image 4 may be an image having the largest number of effective pixels among the remaining images excluding the base image 3 of the plurality of images acquired by the acquisition unit 10. Hereinafter, each of the base image 3 and the reference image 4 is described as one photographed image acquired by the camera 110. The exposure value X associated with the base image 3 and the exposure value Y associated with the reference image 4 are different from each other.

Next, the process to acquire the pseudo-exposure value Z by the acquisition unit 10 is described. The pseudo-exposure value Z is a target exposure value. In other words, the pseudo-exposure value Z is an exposure value estimated to be associated with a pseudo-image 5 generated by the generation unit 30 if the pseudo-image 5 is imaged by the camera 110. For example, the pseudo-exposure value Z is different from the exposure value X and the exposure value Y among the exposure values set by user operation through the input device 130. Note that the acquisition unit 10 may acquire, as the pseudo-exposure value Z, an exposure value that has been automatically generated to be different from the exposure value X and the exposure value Y, by an apparatus outside the image generation apparatus 1, such as the CPU.

Figure 3:
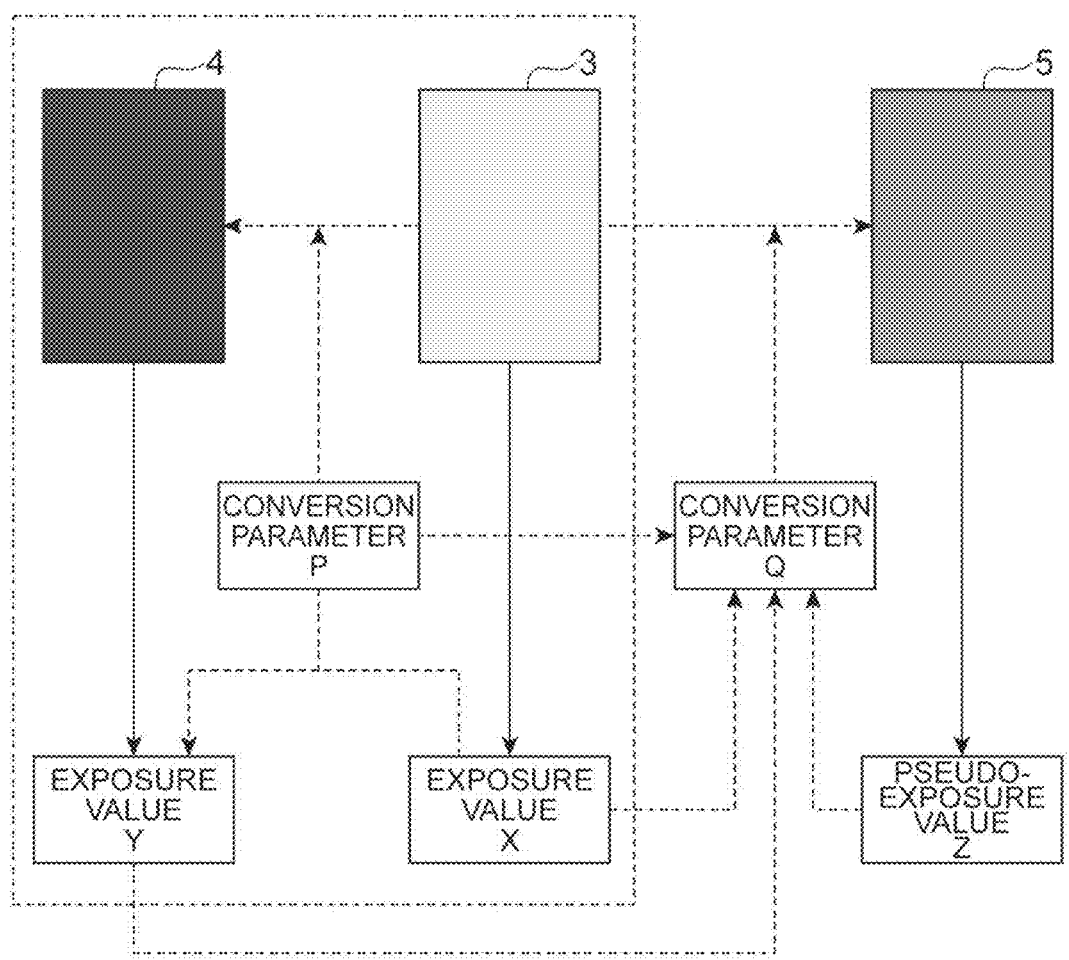
FIG. 3 is a conceptual diagram illustrating a pseudo-image generation process by the image generation apparatus according to the embodiment.

The estimation unit 20 acquires the base image 3, the reference image 4, the exposure value X, the exposure value Y, and the pseudo-exposure value Z from the acquisition unit 10. FIG. 3 is a conceptual diagram illustrating a pseudo-image generation process by the image generation apparatus according to the embodiment. A dashed frame conceptually indicates denotation of the process performed by the estimation unit 20. As illustrated in FIG. 3, the estimation unit 20 estimates a conversion parameter P that corresponds to a difference between the exposure value X associated with the base image 3 and the exposure value Y associated with the reference image 4, and correlates the luminance value of the base image 3 with the luminance value of the reference image 4 for each of the pixels. The conversion parameter P represents relationship of the luminance values at the correlated pixels (positions) between the base image 3 and the reference image 4 that are different in exposure value.

Figure 4:
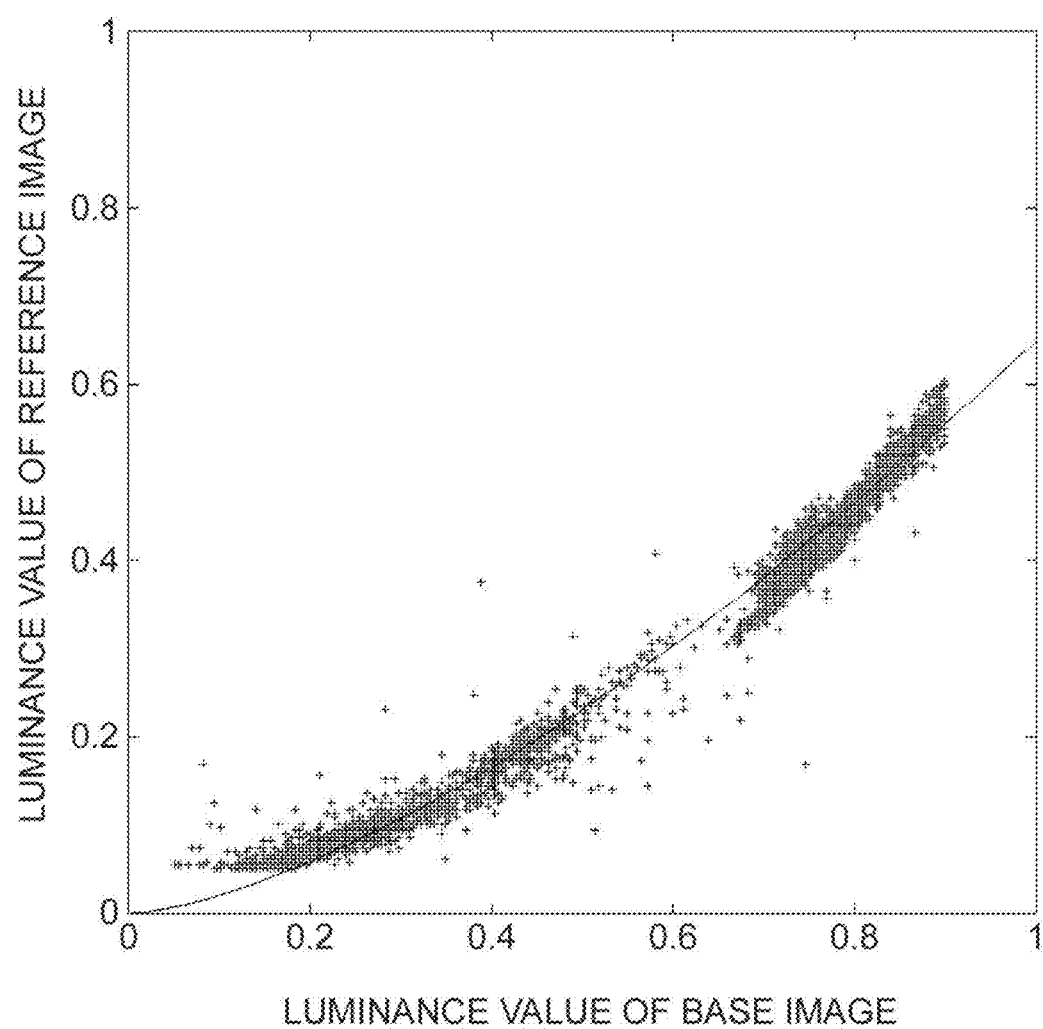
FIG. 4 is a diagram illustrating an example of conversion parameter estimation by an estimation unit of the image generation apparatus according to the embodiment.

FIG. 4 is a diagram illustrating an example of conversion parameter estimation by the estimation unit of the image generation apparatus according to the embodiment. FIG. 4 illustrates a graph in which an abscissa indicates the luminance value of the base image and an ordinate indicates the luminance value of the reference image. The abscissa and the ordinate each may take a value from a lower limit 0 to an upper limit 1 corresponding to a normalized luminance value. For example, to estimate the conversion parameter P, the estimation unit 20 samples a set of the luminance values at the same pixels (positions) of the base image 3 and the reference image 4, and plots relationship of the luminance values as illustrated in FIG. 4. The estimation unit 20 performs fitting on a result of the plot to estimate the conversion parameter P. For example, when a luminance value at a sampling point i of the base image 3 is denoted by $K_i$, a function to convert the luminance value of the base image 3 into the luminance value of the reference image 4 is denoted by $f(K_i)$, and a luminance value at a sampling point i of the reference image 4 is denoted by $U_i$, the fitting may be performed by a Gauss-Newton method using an error function e represented in the following expression 1.

$$e=\Sigma\{(f(K_i)-U_i)^2\} \quad (1)$$

The estimation unit 20 may exclude a pixel in which a moving object is estimated and pixels in the vicinity thereof, from sampling points in estimation of the conversion parameter P because the moving object affects change of the luminance value. In the pixel in which the moving object is estimated and the pixels in the vicinity thereof, the difference between the exposure value X and the exposure value Y is considerably large as compared with the many other pixels and becomes an outlier. The sampling point having the outlier is largely deviated from the conversion parameter P that is obtained by the fitting based on the luminance values of the many other pixels. It may be determined whether the sampling point is deviated, based on a predetermined error with respect to the conversion parameter P, as necessary.

In a case where the sampling point having the outlier is present, the pixel may be excluded from the sampling points, and the sampling may be executed again. It may be determined whether to perform the sampling again, based on a predetermined ratio of the number of sampling points each having the outlier with respect to the total number of sampling points of the pixels. Note that outlier removal by robust estimation may be performed to exclude the sampling point having the outlier from the fitting.

For example, a moving vector of the moving object may be detected, and it may be determined whether to exclude the pixel of the moving object, based on likelihood of the moving object in each of the pixels of the base image 3 and the reference image 4. Since a point with underexposure or overexposure is excluded from the sampling points, the estimation unit 20 may not adopt a luminance value higher than or equal to a predetermined value and a luminance value lower than or equal to a predetermined value, as the sampling point. The estimation unit 20 may adopt, for example, a luminance value included in a range from 10 to 245, as the sampling point.

The generation unit 30 acquires the base image 3, the reference image 4, the exposure value X, the exposure value Y, and the pseudo-exposure value Z from the acquisition unit 10. The generation unit 30 acquires the conversion parameter P from the estimation unit 20. As illustrated in FIG. 3, the generation unit 30 converts the luminance value of the base image 3 for each of the pixels based on the exposure value X associated with the base image 3, the exposure value Y associated with the reference image 4, the pseudo-exposure value Z, and the conversion parameter P, thereby generating the pseudo-image 5. The pseudo-image 5 is an image regarded as being photographed with the pseudo-exposure value Z that is different from both of the exposure value X and the exposure value Y. The image generation apparatus 1 may acquire a plurality of pseudo-exposure values Z by the acquisition unit 10, and may generate a plurality of pseudo-images 5 by the generation unit 30.

The generation unit 30 estimates a conversion parameter Q to convert the luminance value of the base image 3 for each of the pixels. The conversion parameter Q for conversion into the pseudo-image 5 corresponds to a difference between the exposure value X associated with the base image 3 and the pseudo-exposure value Z. The conversion parameter Q for conversion into the pseudo-image 5 represents relationship of the luminance values at the correlated pixels (positions) between the base image 3 and the pseudo-image 5. The generation unit 30 may record the pseudo-image 5 in the recording device 121.

The generation unit 30 may generate the pseudo-image 5 by assuming that a first conversion parameter and a second conversion parameter are equal to each other. The first conversion parameter is to obtain an image photographed with a second exposure value that is an exposure value increased or decreased by a predetermined value from a first exposure value, from an image photographed with the first exposure value. The second conversion parameter is to obtain an image photographed with a third exposure value that is an exposure value increased or decreased by the predetermined value from the second exposure value, from the image photographed with the second exposure value. In other words, the assumption indicates that the conversion parameter increasing/decreasing an optional image by the number of steps of a predetermined exposure value (predetermined value) is fixed irrespective of the number of steps of the exposure value of an image to be processed.

Figure 5:
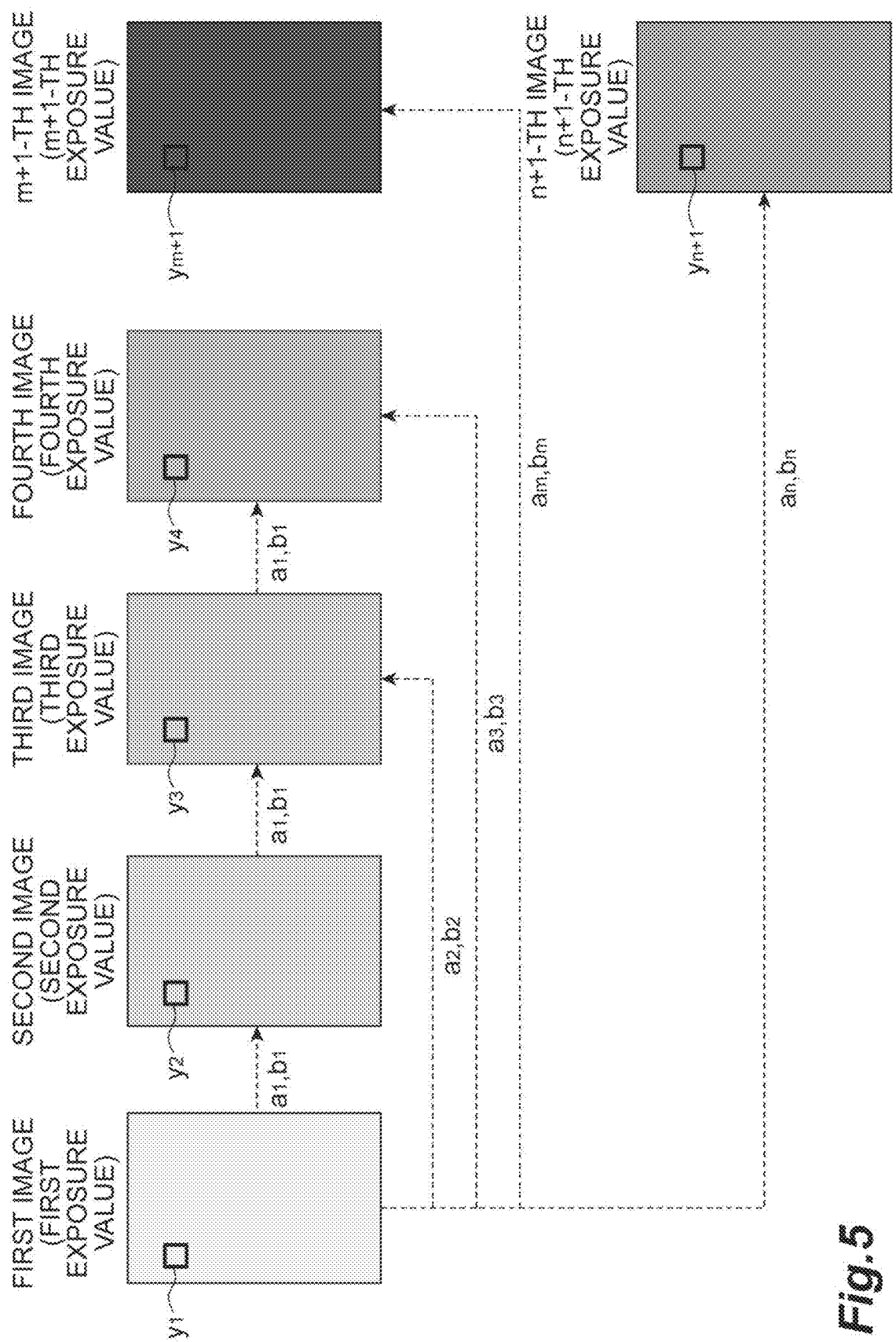
FIG. 5 is a conceptual diagram illustrating an example of conversion parameters in the estimation unit and a generation unit of the image generation apparatus according to the embodiment.

A case where an optional image is applied to the estimation unit 20 based on the above-described assumption is described. FIG. 5 is a conceptual diagram illustrating an example of the conversion parameter in each of the estimation unit and the generation unit of the image generation apparatus according to the embodiment. As illustrated in FIG. 5, a first image, a second image, a third image, and a fourth image are images photographed with a first exposure value, a second exposure value, a third exposure value, and a fourth exposure value, respectively. In a case where a difference between the first exposure value and the second exposure value, a difference between the second exposure value and the third exposure value, and a difference between the third exposure value and the fourth exposure value are each equal to the same predetermined value, a conversion parameter to convert a first luminance value $y_1$ of the first image into a second luminance value $y_2$ of the second image, a conversion parameter to convert the second luminance value $y_2$ of the second image into a third luminance value $y_3$ of the third image, and a conversion parameter to convert the third luminance value $y_3$ of the third image into a fourth luminance value $y_4$ of the fourth image are each equal to a same conversion parameter $p_1$ (($a_1$, $b_1$) in FIG. 5). Note that a suffix of the conversion parameter P represents the number of steps of the exposure value.

In the estimation unit 20, the conversion parameter $P_1$ ($a_1$, $b_1$) to convert the first luminance value $y_1$ of the first image into the second luminance value $y_2$ of the second image is expressed by the following expression 2 by the fitting.

$$y_2 = a_1 y_1^{b_1} \qquad (2)$$

Since the difference between the first exposure value and the second exposure value and the different between the second exposure value and the third exposure value are each equal to the same predetermined value, a conversion parameter $P_2$ to convert the first luminance value $y_1$ of the first image into the third luminance value $y_3$ of the third image is expressed by the following expression 3 from the above-described assumption.

$$y_3 = a_2 y_1^{b_2} = a_1 y_2^{b_1} = a_1 (a_1 y_1^{b_1})^{b_1} = a_1^{b_1+1} y_1^{b_1^2} \qquad (3)$$
$$a_2 = a_1^{b_1+1}$$
$$b_2 = b_1^2$$

Since the difference between the first exposure value and the second exposure value, the difference between the second exposure value and the third exposure value, and the difference between the third exposure value and the fourth exposure value are each equal to the same predetermined value, a conversion parameter $P_3$ to convert the first luminance value $y_1$ of the first image into the fourth luminance value $y_4$ of the fourth image is expressed by the following expression 4 from the above-described assumption.

$$y_4 = a_3 y_1^{b_3} = a_1 y_3^{b_1} = a_1 (a_1^{b_1+1} y_1^{b_1^2})^{b_1} = a_1^{b_1^2+b_1+1} y_1^{b_1^3}$$
$$a_3 = a_1^{b_1^2+b_1+1}$$
$$b_3 = b_1^3 \qquad (4)$$

Hereinafter, in a case where an (m+1)-th luminance value of an (m+1)-th image having metadata of an (m+1)-th exposure value that is different by m times of a predetermined value from the first exposure value is denoted by $y_{m+1}$, a conversion parameter $P_m$ to convert the first luminance value $y_1$ of the first image into the (m+1)-th luminance value $y_{m+1}$ of the (m+1)-th image is recursively expressed by the following expression 5 from the above-described assumption, where m is a natural number. Further, also in a case where the base image 3 is used as the first image, the exposure value X is used as the first exposure value, the reference image 4 is used as the (m+1)-th image, and the exposure value Y is used as the (m+1)-th exposure value in the above-described assumption, the conversion parameter P is expressed by the following expression 5.

$$y_{m+1} = a_1^{\Sigma_{i=0}^{m-1} b_1^i} y_1^{b_1^m}$$
$$a_m = a_1^{\Sigma_{i=0}^{m-1} b_1^i} = a_1^{\Sigma_{i=0}^{m-1} b_m^{i/m}}$$
$$b_m = b_1^m \qquad (5)$$

Next, in the generation unit 30, the base image 3 is used as the first image, the exposure value X is used as the first exposure value, and the luminance value of the base image 3 is used as the first luminance value $y_1$ in the above-described assumption. Further, the reference image 4 is used as the (m+1)-th image, the exposure value Y is used as the (m+1)-th exposure value, and the luminance value of the reference image 4 is used as the (m+1)-th luminance value $y_{m+1}$. Furthermore, the pseudo-image 5 is used as an (n+1)-th image, the pseudo-exposure value Z is used as an (n+1)-th exposure value, and the luminance value of the pseudo-image 5 is used as an (n+1)-th luminance value $y_{n+1}$. At this time, a difference between the exposure value X (first exposure value) and the exposure value Y ((m+1)-th exposure value) is m times of the predetermined value, and a difference between the exposure value X (first exposure value) and the pseudo-exposure value Z ((n+1)-th exposure value) is n times of the predetermined value, where n is a natural number.

The generation unit 30 converts the luminance value of the base image 3 for each of the pixels to generate the pseudo-image 5. In other words, the base image 3 is an original image for generation of the pseudo-image 5, among the plurality of images acquired by the acquisition unit 10. The conversion parameter $P_m$ estimated from the base image 3, the reference image 4, the exposure value X, and the exposure value y is represented by ($a_m$, $b_m$). Accordingly, when the generation unit 30 generates the pseudo-image 5 from the base image 3, the conversion parameter $Q_n$ ($a_n$, $b_a$) for conversion into the pseudo-image 5 is expressed by the following expression 6 using the conversion parameter $P_m$.

$$y_{n+1} = a_n y_1^{b_n} = a_n \{(y_{m+1}/a_m)^{1/b_m}\}^{b_n} \quad (6)$$

$$a_n = a_1^{1/\sum_{i=0}^{n-1} b_1^i} = \left(a_m^{1/\sum_{i=0}^{m-1} b_m^{i/m}}\right)^{\sum_{i=0}^{n-1} b_1^i} = a_m^{\sum_{i=0}^{n-1} b_m^{i/m} / \sum_{i=0}^{m-1} b_m^{i/m}}$$

$$b_n = b_1^n = (b_m^{1/m})^n = b_m^{n/m}$$

As described above, when the estimation unit 20 estimates the conversion parameter P in the case where the difference between the exposure value X and the exposure value Y is equal to the predetermined value, the generation unit 30 can represent the conversion parameter Q for conversion into the pseudo-image 5 with respect to the optional pseudo-exposure value Z as expressed by the expression 6, based on the exposure value X, the exposure value Y, the pseudo-exposure value Z, and the conversion parameter P.

Note that the conversion parameter P is the parameter estimated to correspond to the difference between the exposure value X (first exposure value) and the exposure value Y ((m+1)-th exposure value) and to correlate the luminance values for each of the pixels, and may include an error in the estimation. The conversion parameter Q for conversion into the pseudo-image 5 is the parameter estimated based on the conversion parameter P including the error in the estimation, and may further include an error in the derivation. The difference of the exposure value between the images is correlated with the change amount of the luminance value for each of the pixels. The conversion parameter Q for conversion into the pseudo-image 5 is correlated with the change amount of the luminance value. Accordingly, the difference of the exposure value between the images is correlated with the error of the conversion parameter Q for conversion into the pseudo-image 5.

In the case where the generation unit 30 adopts the conversion parameter Q for conversion into the pseudo-image 5, influence by the error of the conversion parameter Q for conversion into the pseudo-image 5 is reduced as the difference of the exposure value between the images is smaller. Accordingly, the acquisition unit 10 may acquire, as the base image 3, image that has metadata of the exposure value X having the smallest difference from the pseudo-exposure value Z, among the plurality of images. The generation unit 30 converts the luminance value of the base image 3 acquired by the acquisition unit 10, for each of the pixels, to generate the pseudo-image 5. This makes it possible to suppress influence on generation accuracy of the pseudo-image 5 by the error in the estimation of the conversion parameter P and the error in the derivation of the conversion parameter Q for conversion into the pseudo-image 5.

The generation accuracy indicates a similarity of the luminance value for each of the pixels of the pseudo-image 5 with respect to the image photographed when the exposure value is set to the pseudo-exposure value Z in the camera 110. Note that, in the case where the plurality of reference images 4 are used and in the case where the difference between the exposure value X and the pseudo-exposure value Z is equal to the difference between the exposure value Y and the pseudo-exposure value Z, any of the base image 3 and the reference image 4 may be selected as a conversion object.

As illustrated in FIG. 1, the image generation apparatus 1 may include a composition unit 40. The composition unit 40 acquires the base image 3 and the reference image 4 from the acquisition unit 10, and acquires the pseudo-image 5 from the generation unit 30. The composition unit 40 performs HDR (High Dynamic Range) composition based on at least one of the base image 3 and the reference image 4, and the pseudo-image 5. The composition unit 40 performs the HDR composition by a method similar to an existing HDR composing method. The composition unit 40 outputs a composite image as an image subjected to the HDR composition. The composition unit 40 may record the composite image in the recording device 121. A plurality of pseudo-images 5 may be used. The composition unit 40 may compose the base image 3 that is an original image to be converted into the pseudo-image 5 by the generation unit 30 out of the base image 3 and the reference image 4, with one or more pseudo-images 5.

In the terminal 2, information output from the image generation apparatus 1 is transmitted to the recording device 121, the display control unit 140, and the display unit 150. The recording device 121 is a recording medium such as a hard disk. The recording device 121 records the data used in the image generation apparatus 1, such as the exposure value X, the exposure value Y, the pseudo-exposure value Z, the pseudo-image 5, the composite image, the conversion parameter P, and the conversion parameter Q for conversion into the pseudo-image 5. The recording devices 120 and 121 may be one recording medium.

The display control unit 140 is connected to the acquisition unit 10, the estimation unit 20, the generation unit 30, or the composition unit 40 inside the image generation apparatus 1, and to the display unit 150 outside the image generation apparatus 1. The display control unit 140 controls display on the display unit 150. The display control unit 140 controls the display unit 150 to display the exposure value X, the exposure value Y, the pseudo-exposure value Z, the pseudo-image 5, or the composite image. The display control unit 140 may display the base image 3, the reference image 4, the conversion parameter P, and the conversion parameter Q for conversion into the pseudo-image 5, on the display unit 150.

The display unit. 150 is connected to the display control unit 140, and displays contents controlled by the display control unit 140. The display unit 150 displays the base image 3, the reference image 4, the exposure value X, the exposure value Y, the pseudo-exposure value Z, the conversion parameter P, the conversion parameter Q for conversion into the pseudo-image 5, the pseudo-image 5, or the composite image. The display unit 150 is, for example, a display.

[Image Generation Process]

Figure 6:
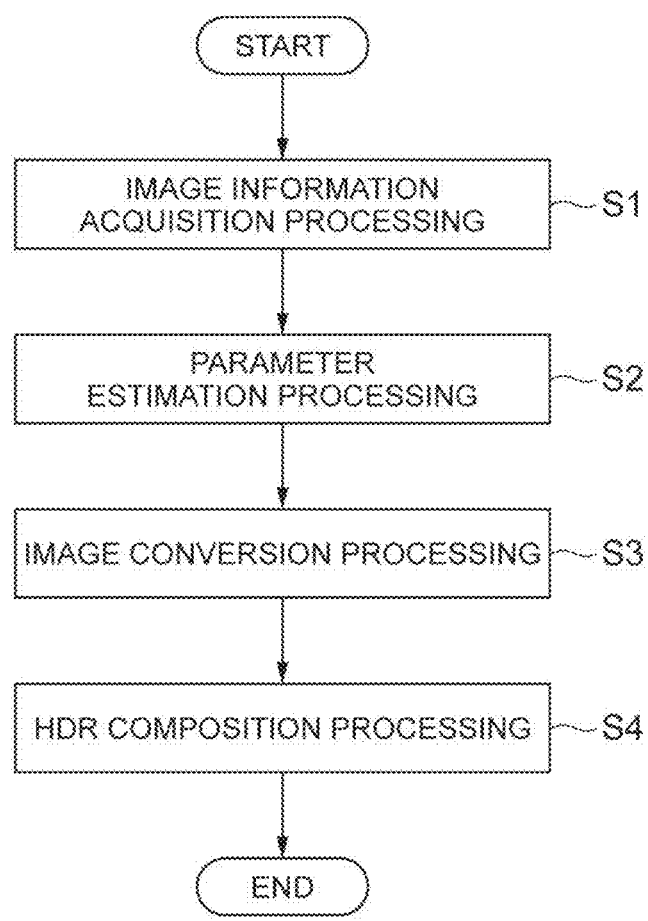
FIG. 6 is a flowchart illustrating an image generation process by the image generation apparatus according to the embodiment.

Next, operation of the image generation apparatus 1 is described. FIG. 6 is a flowchart illustrating the image generation process by the image generation apparatus according to the embodiment. The image generation process illustrated in FIG. 6 is started, for example, when an HDR composition mode is selected by user operation in the terminal 2, and the camera 110 consecutively captures a plurality of images.

First, in image information acquisition processing (S1: acquisition step), the acquisition unit 10 acquires the base image 3 and the reference image 4 photographed with different exposure values, the exposure value X, the exposure value Y, and the pseudo-exposure value Z from the camera 110 or the recording device 120. In a case where the pseudo-exposure value Z is set by the user operation, the acquisition unit 10 acquires the pseudo-exposure value Z set through the input device 130. The acquisition unit 10 may acquire, as the base image 3, an image photographed with an exposure value having the smallest difference from the pseudo-exposure value Z among the plurality of images. An image other than the base image 3 among the plurality of images acquired by the acquisition unit 10 may be acquired as the reference image 4.

In the case where at least the pseudo-exposure value Z is coincident with the exposure value X or the exposure value Y, the acquisition unit 10 transmits the exposure value X, the exposure value Y, and the pseudo-exposure value Z to the display control unit 140. The display control unit 140 displays the exposure value X, the exposure value Y, and the pseudo-exposure value Z on the display unit 150. In the case where the pseudo-exposure value Z is coincident with the exposure value X or the exposure value Y, the user inputs a value to the input device 130 again such that the pseudo-exposure value Z becomes a value different from the exposure value X and the exposure value Y, based on the information displayed on the display unit 150. Note that the acquisition unit 10 may acquire, as the pseudo-exposure value Z, an exposure value automatically generated to be different from the exposure value X and the exposure value Y. The acquisition unit 10 may acquire a plurality of pseudo-exposure values Z.

Next, in estimation processing (S2: estimation step), the estimation unit 20 estimates the conversion parameter P that corresponds to the difference between the exposure value X associated with the base image 3 and the exposure value Y associated with the reference image 4, and correlates the luminance value of the base image 3 with the luminance value of the reference image 4 for each of the pixels. For example, the estimation unit 20 samples a plurality of sets of the luminance values at the same pixels (positions) of the base image 3 and the reference image 4, and plots relationship of the luminance values. The pixel to be sampled may be selected to exclude a pixel indicating an outlier. The estimation unit 20 performs fitting on a result of the plot to estimate the conversion parameter P.

Next, in image conversion processing (S3: generation step), the generation unit 30 converts the luminance value of the base image 3 for each of the pixels based on the exposure value X associated with the base image 3, the exposure value Y associated with the reference image 4, the conversion parameter P, and the pseudo-exposure value Z, thereby generating the pseudo-image 5. The generation unit 30 assumes that the conversion parameter increasing/decreasing an optional image by the number of steps of a predetermined exposure value (predetermined value) is fixed irrespective of the number of steps of the exposure value of an image to be processed, and estimates the conversion parameter Q for conversion into the pseudo-image 5 with use of the base image 3, the reference image 4, the exposure value X, the exposure value Y, the pseudo-exposure value Z, and the conversion parameter P. On this assumption, the conversion parameter Q for conversion into the pseudo-image 5 is expressed by using the conversion parameter P.

The generation unit 30 applies the conversion parameter Q for conversion into the pseudo-image 5 expressed in the expression 6, to the luminance value of the base image 3 for each of the pixels, thereby generating the pseudo-image 5. The generation unit 30 may generate a plurality of pseudo-images 5 corresponding to a plurality of pseudo-exposure values Z. When the pseudo-image 5 is acquired, the image conversion processing (S3) ends. As the image generation process, the processing may thereafter proceed to HDR composition processing (S4).

In the HDR composition processing (S4), the composition unit 40 performs the HDR composition based on the base image 3, the reference image 4, and the pseudo-image 5, thereby generating a composite image. The HDR composition in the HDR composition processing (S4) is performed by a well-known method. The composition unit 40 may perform the HDR composition based on at least one of the base image 3 and the reference image 4, and the pseudo-image 5, and output the composite image. In this case, the plurality of pseudo-images 5 may be used. The composition unit 40 may compose the base image 3 that is an original image to be converted into the pseudo-image 5 by the generation unit 30 out of the base image 3 and the reference image 4, with one or more pseudo-images 5.

[Image Generation Program]

An image generation program to operate the image generation apparatus 1 is described. The image generation program includes a main module, an acquisition module, an estimation module, and a generation module. The image generation program may include a composition module. The main module is a part totally controlling the apparatus. Functions achieved by execution of the acquisition module, the estimation module, the generation module, and the composition module are respectively similar to the functions of the acquisition unit 10, the estimation unit 20, the generation unit 30, and the composition unit 40 of the image generation apparatus 1 described above.

Summary of Embodiment

The image generation apparatus 1, the image generation method, or the image generation program according to the present embodiment can obtain an image that is regarded as being photographed at the same timing with the different exposure value relative to one photographed image. Further, the image generation apparatus 1 can generate the plurality of pseudo-images 5 by the generation unit 30 by acquiring the plurality of pseudo-exposure values Z by the acquisition unit 10. As a result, the composition unit 40 can obtain a composite image in which an original appearance of a moving object is depicted based on the plurality of images with different exposure values by composing the base image 3 that is an original image to be converted into the pseudo-image 5 by the generation unit 30 out of the base image 3 and the reference image 4, with the pseudo-image 5.

Further, on the assumption that the conversion parameter increasing/decreasing an optional image by the number of steps of a predetermined exposure value (predetermined value) is fixed irrespective of the number of steps of the exposure value of an image to be processed, the conversion parameter Q for conversion into the pseudo-image 5 can be recursively estimated using the conversion parameter P based on the number of steps of the difference between the exposure value X of the base image 3 and the exposure value Y of the reference image 4, and the number of steps of the difference between one of the exposure value X and the exposure value Y, and the pseudo-exposure value Z. The generation unit 30 can generate the pseudo-image 5 from the base image 3 with use of the conversion parameter Q for conversion into the pseudo-image 5. This makes it possible to estimate the conversion parameter Q for conversion into the pseudo-image 5 with respect to the optional pseudo-exposure value Z. Accordingly, the pseudo-exposure value Z necessary to acquire the pseudo-image 5 can be flexibly set without being fixed by an imaging time of the bracket imaging function of the camera 110.

Further, the acquisition unit 10 acquires the plurality of images and the pseudo-exposure value Z, acquires, as the base image 3, an image photographed with an exposure value having the smallest difference from the pseudo-exposure value Z among the plurality of images, and acquires, as the reference image 4, an image other than the base image 3 among the plurality of images. As a result, the luminance value of the base image 3 having the smallest difference from the pseudo-exposure value Z is converted for each of the pixels to generate the pseudo-image 5, which makes it possible to suppress influence on generation accuracy of the pseudo-image 5 by the error in the estimation of the conversion parameter P and the error in the derivation of the conversion parameter Q for conversion into the pseudo-image 5. Accordingly, it is possible to generate the pseudo-image 5 different in exposure value from each of the base image 3 and the reference image 4, with high accuracy.

Although the embodiment of the present disclosure has been described above, the present disclosure is not limited to the above-described embodiment. For example, the image generation apparatus 1 may include the camera 110, the recording devices 120 and 121, the input device 130, the display control unit 140, or the display unit 150 of the terminal 2. The acquisition of the pseudo-exposure value Z by the acquisition unit 10 may not be performed in the image information acquisition processing (S1), and may be performed at any time before the image conversion processing (S3).

Further, the base image 3 acquired by the acquisition unit 10 is not limited to the image photographed with the exposure value having the smallest difference from the pseudo-exposure value Z, among the plurality of images. For example, the acquisition unit 10 may acquire, as the base image 3, an image photographed with an exposure value that is different from the pseudo-exposure value Z by a predetermined threshold or lower among the plurality of images. When there are a plurality of images photographed with the exposure value that is different from the pseudo-exposure value Z by the predetermined threshold or lower, an image optionally selected from the plurality of images may be acquired as the base image 3, or an image having the largest number of effective pixels among the plurality of images may be acquired as the base image 3.

Further, an exposure value that is not an integer can be derived from the expression 6. For example, in a case where n is a natural number lower than or equal to m, and the (m+1)-th exposure value is an exposure value k (k is natural number), the (n+1)-th exposure value is expressed by k·n/m.

Further, the conversion parameter P and the conversion parameter Q for conversion into the pseudo-image 5 respectively derived by the estimation unit 20 and the generation unit 30 each may not be represented by a parameter associated with the functions in the expression 2 to the expression 6. The conversion parameter P may be, for example, a parameter obtained as a result of machine learning on the luminance values at the correlated pixels (positions) between the base image 3 and the reference image 4. The conversion parameter Q for conversion into the pseudo-image 5 may be represented using the conversion parameter P obtained by the machine learning. As the conversion parameter Q for conversion into the pseudo-image 5, a corresponding parameter may be derived by performing the machine learning on the plurality of images acquired by the acquisition unit 10 and the exposure values associated with the respective images. The image generation method may include a composition step in which processing similar to the HDR composition processing (S4) is performed.

Further, the present disclosure includes an image generation apparatus, an image generation method, and an image generation program described below.

In one embodiment, the image generation apparatus may further include a composition unit that performs HDR composition based on at least one of the base image and the reference image, and the pseudo-image. In this case, the base image, the reference image, and the pseudo-image are different in associated exposure value. The pseudo-image can be regarded as an image photographed at the timing same as the timing of the base image. Accordingly, the composition unit can acquire an HDR composite image based on a plurality of images with different exposure values. Further, the composition unit can acquire an HDR composite image in which an original appearance of a moving object is depicted based on the plurality of images with different exposure values by composing the base image as an original image to be converted into the pseudo-image by the generation unit, with one or more pseudo-images.

In one embodiment, in the image generation apparatus, the generation unit generates the pseudo-image by assuming that a first conversion parameter and a second conversion parameter are equal to each other. The first conversion parameter is to obtain an image photographed with a second exposure value that is an exposure value increased or decreased by a predetermined value from a first exposure value, from an image photographed with the first exposure value. The second conversion parameter is to obtain an image photographed with a third exposure value that is an exposure value increased or decreased by the predetermined value from the second exposure value, from the image photographed with the second exposure value. On the assumption that the conversion parameter increasing/decreasing an optional image by the number of steps of a predetermined exposure value (predetermined value) is fixed irrespective of the number of steps of the exposure value of an image to be processed, a conversion parameter for conversion into the pseudo-image can be recursively estimated using the conversion parameter based on the number of steps of the difference between the exposure value of the base image and the exposure value of the reference image, and the number of steps of the difference between the exposure value of the base image and the pseudo-exposure value. The generation unit can generate the pseudo-image from the base image with use of the conversion parameter for conversion into the pseudo-image. This makes it possible to estimate the conversion parameter for conversion into the pseudo-image with respect to the optional pseudo-exposure value. Accordingly, the pseudo-exposure value necessary to acquire the pseudo-image can be flexibly set without being fixed by an imaging time of the bracket imaging function of the camera.

In one embodiment, in the image generation apparatus, the acquisition unit may acquire a plurality of images and the pseudo-exposure value, may acquire, as the base image, an image photographed with an exposure value having the smallest difference from the pseudo-exposure value among the plurality of images, and may acquire, as the reference image, an image other than the base image among the plurality of images. The generation unit may generate the pseudo-image by converting the luminance value of the reference image for each of the pixels. The conversion parameter is an estimated parameter that corresponds to the difference between the exposure value associated with the base image and the exposure value associated with the reference image, and correlates the luminance values for each of the pixels, and may include an error in estimation. The conversion parameter for conversion into the pseudo-image is a parameter estimated based on the conversion parameter including the error in the estimation, and may further include an error in derivation. The difference of the exposure value between the images is correlated with a change amount of the luminance value for each of the pixels. The conversion parameter Q for conversion into the pseudo-image 5 is correlated with a change amount of the luminance value. Accordingly, the difference of the exposure value between the images is correlated with the error of the conversion parameter Q for conversion into the pseudo-image 5. Thus, in the case where the generation unit adopts the conversion parameter for conversion into the pseudo-image, influence by the error of the conversion parameter for conversion into the pseudo-image is reduced as the difference of the exposure value between the images is smaller. The generation unit generates the pseudo-image from the base image including metadata of the exposure value having the smallest difference from the pseudo-exposure value, which makes it possible to suppress influence on generation accuracy of the pseudo-image by the error in the estimation of the conversion parameter and the error in the derivation of the conversion parameter for conversion into the pseudo-image. As a result, it is possible to generate the pseudo-image different in exposure value from the base image and the reference image, with high accuracy.

An image generation method according to another aspect of the present disclosure, includes a step of acquiring a base image and a reference image photographed with different exposure values, the respective exposure values associated with the base image and the reference image, and a pseudo-exposure value different from the respective exposure values associated with the base image and the reference image; a step of estimating a conversion parameter, the conversion parameter corresponding to a difference between the respective exposure values associated with the base image and the reference image, and correlating a luminance value of the base image with a luminance value of the reference image for each of pixels; and a step of generating a pseudo-image regarded as an image photographed with the pseudo-exposure value by converting the luminance value of the base image for each of the pixels based on the respective exposure values associated with the base image and the reference image, the pseudo-exposure value, and the conversion parameter. The image generation method achieves the effects same as the effects by the above-described image generation apparatus.

An image generation program according to still another aspect of the present disclosure causes a computer to function as the above-described image generation apparatus. The image generation program achieves the effects same as the effects by the above-described image generation apparatus.

REFERENCE SIGNS LIST

1 . . . image generation apparatus, 2 . . . terminal, 3 . . . base image, 4 . . . reference image, 5 . . . pseudo-image, 10 . . . acquisition unit, 20 . . . estimation unit, 30 . . . generation unit, 40 . . . composition unit, 100 . . . CPU, 101 . . . ROM, 102 . . . RAM, 103 . . . input device, 104 . . . output device, 105 . . . auxiliary storage device, 110 . . . camera, 120, 121 . . . recording device, 130 . . . input device, 140 . . . display control unit, 150 . . . display unit

What is claimed is:

1. An image generation apparatus, comprising:
an acquisition unit implemented by a processor, the acquisition unit configured to acquire a base image and a reference image photographed with different exposure values, the respective exposure values associated with the base image and the reference image, and a pseudo-exposure value different from the respective exposure values associated with the base image and the reference image;
an estimation unit implemented by the processor, the estimation unit configured to estimate a conversion parameter, wherein the conversion parameter corresponds to a difference between the respective exposure values associated with the base image and the reference image, and the conversion parameter expresses a function to convert a first luminance value of the base image to a second luminance value of the reference image;
a generation unit implemented by the processor, the generation unit configured to generate a pseudo-image regarded as an image photographed with the pseudo-exposure value by converting the first luminance value of the base image for each pixel of the base image based on the respective exposure values associated with the base image and the reference image, the pseudo-exposure value, and the conversion parameter, and
a composition unit implemented by the processor, the composition unit configured to perform HDR composition based on at least the pseudo-image.

2. The image generation apparatus according to claim 1, wherein the composition unit is further configured to perform the HDR composition based on the base image and/or the reference image.

3. The image generation apparatus according to claim 2, wherein the generation unit generates the pseudo-image by assuming that a first conversion parameter and a second conversion parameter are equal to each other, the first conversion parameter being to obtain a second image photographed with a second exposure value that is an exposure value increased or decreased by a predetermined value from a first exposure value, from a first image photographed with the first exposure value, and the second conversion parameter being to obtain a third image photographed with a third exposure value that is an exposure value increased or decreased by the predetermined value from the second exposure value, from the image photographed with the second exposure value.

4. The image generation apparatus according to claim 2, wherein
the acquisition unit acquires a plurality of images and the pseudo-exposure value, acquires, as the base image, an image photographed with an exposure value having a smallest difference from the pseudo-exposure value among the plurality of images, and acquires, as the reference image, an image other than the base image among the plurality of images; and
the generation unit generates the pseudo-image by converting the first luminance value of the base image for each pixel of the base image.

5. The image generation apparatus according to claim 1, wherein the generation unit generates the pseudo-image by assuming that a first conversion parameter and a second conversion parameter are equal to each other, the first conversion parameter being to obtain a second image photographed with a second exposure value that is an exposure value increased or decreased by a predetermined value from a first exposure value, from a first image photographed with the first exposure value, and the second conversion parameter being to obtain a third image photographed with a third exposure value that is an exposure value increased or decreased by the predetermined value from the second exposure value, from the image photographed with the second exposure value.

6. The image generation apparatus according to claim 5, wherein
the acquisition unit acquires a plurality of images and the pseudo-exposure value, acquires, as the base image, an image photographed with an exposure value having a smallest difference from the pseudo-exposure value among the plurality of images, and acquires, as the reference image, an image other than the base image among the plurality of images; and
the generation unit generates the pseudo-image by converting the first luminance value of the base image for each pixel of the base image.

7. The image generation apparatus according to claim 1, wherein
the acquisition unit acquires a plurality of images and the pseudo-exposure value, acquires, as the base image, an image photographed with an exposure value having a smallest difference from the pseudo-exposure value among the plurality of images, and acquires, as the reference image, an image other than the base image among the plurality of images; and
the generation unit generates the pseudo-image by converting the first luminance value of the base image for each pixel of the base image.

8. The image generation apparatus of claim 1, wherein the conversion function is of a form $y_2 = a_1 y_2^{b_1}$ where $y_2$ is the second luminance value of the reference image, $y_1$ is the first luminance value of the base image, the conversion parameter includes $a_1$ and $b_1$ and $b_1$ indicates a nonlinear relationship between $y_2$ and $y_1$.

9. The image generation apparatus of claim 1, wherein the acquisition unit is further configured to acquire the base image and the reference image from a camera after a user selects an HDR composition mode.

10. The image generation apparatus of claim 1, wherein the acquisition unit is further configured to acquire the base image and the reference image from a recording device, wherein the base image and the reference image were photographed at a time in the past.

11. An image generation method, comprising:
acquiring a base image and a reference image photographed with different exposure values, the respective exposure values associated with the base image and the reference image, and a pseudo-exposure value different from the respective exposure values associated with the base image and the reference image;
estimating a conversion parameter, wherein the conversion parameter corresponds to a difference between the respective exposure values associated with the base image and the reference image, and the conversion parameter expresses a function to convert a first luminance value of the base image to a second luminance value of the reference image;
generating a pseudo-image regarded as an image photographed with the pseudo-exposure value by converting the first luminance value of the base image for each pixel of the base image based on the respective exposure values associated with the base image and the reference image, the pseudo-exposure value, and the conversion parameter; and
performing HDR composition based on at least the pseudo-image.

12. A non-transitory computer-readable storage media stored storing an image generation program causing a computer to function as an image generation apparatus, the image generation apparatus comprising:
an acquisition unit implemented by a processor, the acquisition unit configured to acquire a base image and a reference image photographed with different exposure values, the respective exposure values associated with the base image and the reference image, and a pseudo-exposure value different from the respective exposure values associated with the base image and the reference image;
an estimation unit implemented by the processor, the estimation unit configured to estimate a conversion parameter, wherein the conversion parameter corresponds to a difference between the respective exposure values associated with the base image and the reference image, and the conversion parameter expresses a function to convert a first luminance value of the base image to a second luminance value of the reference image;
a generation unit implemented by the processor, the generation unit configured to generate a pseudo-image regarded as an image photographed with the pseudo-exposure value by converting the first luminance value of the base image for each pixel of the base image based on the respective exposure values associated with the base image and the reference image, the pseudo-exposure value, and the conversion parameter; and
a composition unit implemented by the processor, the composition unit configured to perform HDR composition based on at least the pseudo-image.

* * * * *